3,227,733
4-METHYL-16β-MERCAPTO-1,3,5(10)-ESTRATRIEN-17β-OL AND ITS ACYLATE

Norio Tokutake, Ashiya-shi, Japan, assignor to Shionogi & Co., Ltd., Osaka, Japan
No Drawing. Filed Feb. 13, 1964, Ser. No. 344,528
Claims priority, application Japan, Feb. 19, 1963, 38/8,831
6 Claims. (Cl. 260—397.3)

The present invention relates to 4-methyl-16β-mercapto-1,3,5(10)-estratrien-17β-ol and its acylate. More particularly, it relates to 4-methyl-16β-mercapto-1,3,5(10)-estratrien-17β-ol and its acylate represented by the formula:

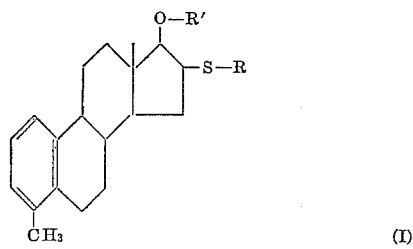

wherein R and R' each represents a hydrogen atom or a lower alkanoyl group (e.g. acetyl, propionyl, butyryl).

The said 4-methyl-16β-mercapto-1,3,5(10)-estratien-17β-ol and its acylate of Formula I are useful as antiuterotropic agents.

Accordingly, it is a basic object of the present invention to embody 4-methyl-16β-mercapto-1,3,5(10)-estratrien-17β-ol and its acylate of Formula I. Another object of the invention is to embody 4-methyl-16β-mercapto-1,3,5(10)-estratrien-17β-ol and its acylate having anti-uterotropic activity. A further object of the invention is to embody a route for the synthesis of 4-methyl-16β-mercapto-1,3,5(10)-estratrien-17β-ol and its acylate. These and other objects will be apparent to those conversant with the art to which the present invention pertains from the subsequent description.

The objective 4-methyl-16β-mercapto-1,3,5(10)-estratrien-17β-ol and its acylate of Formula I are prepared from 4-methyl-1,3,5(10)-estratrien-17-one according to the following scheme:

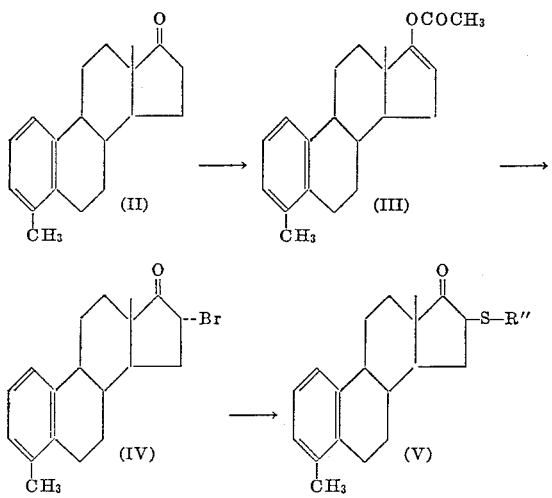

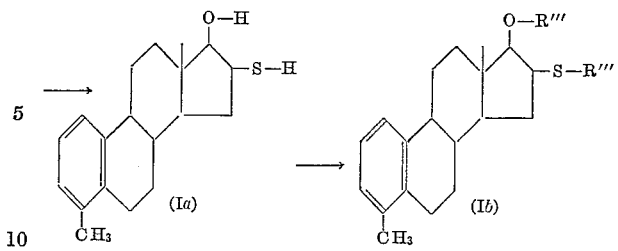

wherein R″ and R‴ each represents a lower alkanoyl group (e.g. acetyl, propionyl, butyryl).

The starting material, 4-methyl-1,3,5(10)-estratrien-17-one of Formula II, is known [Caspi et al.: J. Chem. Soc., p. 1710 (1962)].

According to the present invention, the starting 17-ketone (II) is first subjected to enolesterification. The enolesterification may be carried out by treating the 17-ketone (II) with isopropenyl acetate in the presence of sulfuric acid while refluxing. The resulting enol acetate (III) is then subjected to bromination. The bromination may be executed by treating the enol acetate (III) with bromine in an inert organic solvent (e.g. carbon tetrachloride, chloroform, carbon disulfide) at a low temperature around 0° C. Then, the resultant 16α-bromo-17-ketone (IV) is subjected to reaction with thioalkanoic acid (e.g. thioacetic acid, thiopropionic acid, thiobutyric acid). The reaction is usually effected by treating the 16α-bromo-17-ketone (IV) with an alkali metal salt of the thioalkanoic acid (e.g. sodium thioacetate, potassium thioacetate, potassium thiopropionate, potassium thiobutyrate) in an inert organic solvent (e.g. acetone, ether, dioxane, tetrahydrofuran) at room temperature (10 to 30° C.). The resultant 16β-alkanoylthio-17-ketone (V) is then subjected to reduction. The reduction may be carried out by treating the 16β-alkanoylthio-17-ketone (V) with an alkali metal hydride (e.g. lithium aluminum hydride, lithium borohydride, sodium borohydride) in an inert organic solvent (e.g. ether, dioxane, tetrahydrofuran, benzene), if necessary, while heating.

The thus-prepared 4-methyl-16β-mercapto-1,3,5(10)-estratrien-17β-ol of Formula Ia may be further subjected to acylation. The acylation can be effected by treating the 16β-mercapto-17β-ol (Ia) with an alkanoic anhydride (e.g. acetic anhydride, propionic anhydride, butyric anhydride) in the presence of an organic base (e.g. pyridine, picoline, triethylamine) at a temperature from room temperature (10 to 30° C.) to refluxing temperature.

The thus-obtained 4-methyl-16β-mercapto-1,3,5(10)-estratrien-17β-ol of Formula Ia and 4-methyl-16β-alkanoylthio-17β-alkanoyloxy-1,3,5(10)-estratriene of Formula Ib are useful as anti-uterotropic agents. For instance, 4-methyl-16β-acetylthio-17β-acetyloxy-1,3,5(10)-estratriene produced inhibition of uterine growth induced by 0.03 microgram of estradiol, when subcutaneously administered to mice at a dose of 0.3 milligram.

The following examples set forth illustratively presently-preferred embodiments of the present invention. In the examples, the abbreviations have following significances: g., gram(s); ml., millilitre(s); Anal. calcd., analysis calculated; and ° C., degrees centigrade. Other abbreviations have conventional significances.

Example 1

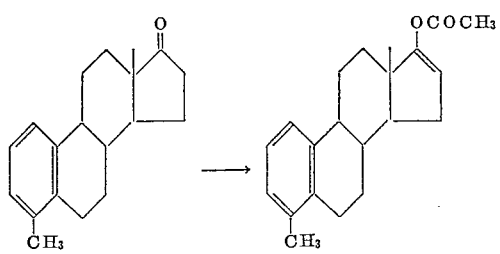

Preparation of 4-methyl-17-acetyloxy - 1,3,5(10),16-estratetraene: A mixture of 4-methyl-1,3,5(10)-estratrien-17-one (3.04 g.) and isopropenyl acetate (25 ml.) is combined together with a mixture of conc. sulfuric acid (0.3 ml.) and isopropenyl acetate (1.5 ml.), and the resultant mixture is refluxed for 1 hour and then concentrated to a half volume in 30 minutes. The reaction mixture is cooled and shaken with ether. The ether layer is separated, washed with dilute sodium bicarbonate solution and water in order, dried over anhydrous sodium sulfate and the solvent evaporated. The residue is chromatographed on alumina (25 g.) and eluted with petroleum ether. The eluate is crystallized from a mixture of methanol and acetone (9:1) to give 4-methyl-17-acetyloxy-1,3,5(10),16-estratetraene (2.35 g.) as crystals melting at 113 to 114° C., $[\alpha]_D^{23}$ +81.9° (c.=1.046, chloroform).

Analysis.—Calcd. for $C_{21}H_{26}O_2$: C, 81.25; H, 8.44. Found: C, 81.13; H, 8.35.

Example 2

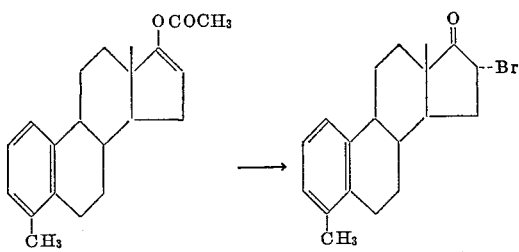

Preparation of 4-methyl-16α-bromo-1,3,5(10) - estratrien-17-one: Into a solution of 4-methyl-17-acetyloxy-1,3,5(10),16-estratetraene (2.30 g.) in carbon tetrachloride (45 ml.), there is suspended potassium carbonate (1.8 g.). A solution of bromine in carbon tetrachloride (129 mg./ml.) is dropwise added to the suspension at a temperature not higher than 0° C. while stirring until the colour of bromine is not decolorized. The resultant mixture is combined with dilute sodium bisulfite solution for decomposing excess of the bromine and shaken with chloroform. The chloroform layer is separated, washed with water, dried over anhydrous sodium sulfate and the solvent evaporated. The residue is crystallized from methanol to give 4 - methyl-16α-bromo-1,3,5(10)-estratrien-17-one (2.25 g.) as crystals melting at 163 to 164.5° C., $[\alpha]_D^{23.5}$ +124.0° (c.=1.103, chloroform).

Analysis.—Calcd. for $C_{19}H_{23}OBr$: C, 65.71; H, 6.68; Br, 23.01. Found: C, 65.87; H, 6.70; Br, 23.18.

Example 3

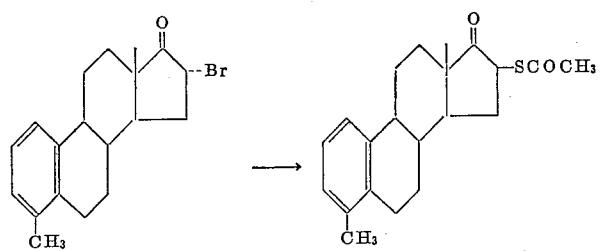

Preparation of 4-methyl-16β-acetylthio-1,3,5(10)-estratrien-17-one: To a solution of 4-methyl-16α-bromo-1,3,5(10)-estratrien-17-one (1.99 g.) in anhydrous acetone (70 ml.), there is added potassium thioacetate (1.2 g.), and the resultant mixture is stirred for 3.5 hours at room temperature (10 to 30° C.). The reaction mixture is combined with water (250 ml.). The separated substance is collected by filtration and crystallized from acetone to give 4-methyl-16β-acetylthio-1,3,5(10)-estratrien - 17-one (1.63 g.) as crystals melting at 211 to 213° C., $[\alpha]_D^{23.5}$ +134.4° (c.=1.096, chloroform).

Analysis.—Calcd. for $C_{21}H_{26}O_2S$: C, 73.64; H, 7.65; S, 9.36. Found: C, 73.69; H, 7.72; S, 9.40.

Example 4

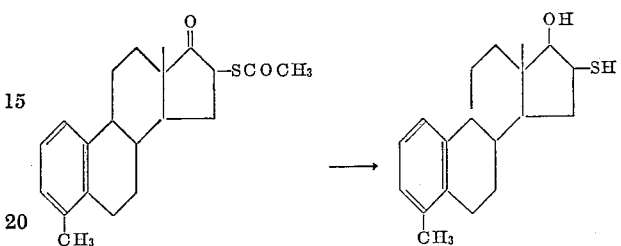

Preparation of 4-methyl-16β-mercapto-1,3,5(10)-estratrien-17β-ol: A solution of 4-methyl-16β-acetylthio-1,3,5(10)-estratrien-17-one (1.82 g.) in anhydrous tetrahydrofuran (100 ml.) is dropwise added to a suspension of lithium aluminum hydride (1.1 g.) in anhydrous ether (100 ml.), and the resultant mixture is refluxed for 3.5 hours. The reaction mixture is combined with a mixture of ice and water. The organic solvent layer is separated, washed with 10% hydrochloric acid, water, 10% sodium carbonate solution and water in order, dried over anhydrous sodium sulfate and the solvent evaporated. The residue is crystallized from methanol to give 4-methyl-16β-mercapto-1,3,5(10)-estratrien-17β-ol (1.44 g.) as crystals melting at 131 to 132° C.

Example 5

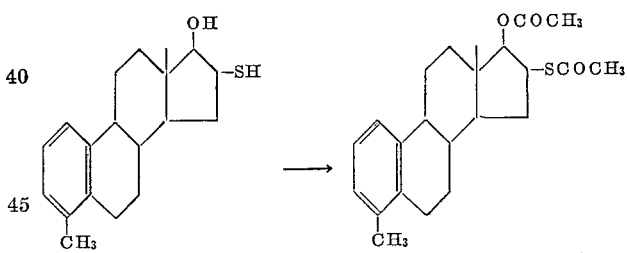

Preparation of 4-methyl-16β-acetylthio-17β - acetyloxy-1,3,5(10)-estratriene: 4-methyl-16β-mercapto - 1,3,5(10)-estratrien-17β-ol (1.40 g.) is combined with pyridine (30 ml.) and acetic anhydride (15 ml.), and the resultant mixture is heated on a water bath for 2.5 hours. After cooling, water is added thereto. The precipitate is collected by filtration, washed with water and crystallized from acetone to give 4-methyl-16β-acetylthio-17β-acetyloxy-1,3,5(10)-estratriene (1.38 g.) as crystals melting at 178.5 to 180° C., $[\alpha]_D^{22.5}$ +78.9° (c.=0.778, chlorofrom).

Analysis.—Calcd. for $C_{23}H_{30}O_3S$: C, 71.46; H, 7.82; S, 8.30. Found: C, 71.70; H, 7.84; S, 8.61.

What is claimed is:
1. 4-methyl-16β-mercapto-1,3,5(10)-estratrien-17β-ol.
2. 4-methyl-16β-lower alkanoylthio-17β-lower alkanoyloxy-1,3,5(10)-estratriene.
3. 4-methyl-16-acetylthio-17β-acetyloxy-1,3,5(10)-estratriene.
4. 4-methyl-16β-lower alkanoylthio - 1,3,5(10) - estratrien-17-one.
5. 4-methyl-16β-acetylthio-1,3,5(10)-estratrien-17-one.
6. 4-methyl-16α-bromo-1,3,5(10)-estratrien-17-one.

References Cited by the Examiner
UNITED STATES PATENTS 2,928,847  3/1960  Johns _____ 260—396.3

LEWIS GOTTS, Primary Examiner.